(12) United States Patent
Michalopoulos et al.

(10) Patent No.: US 12,470,270 B2
(45) Date of Patent: Nov. 11, 2025

(54) BEAM DIRECTIONALITY ERRORS

(71) Applicant: Nokia Technologies Oy, Espoo (FI)

(72) Inventors: Diomidis Michalopoulos, Munich (DE); Oana-Elena Barbu, Aalborg (DK); Ryan Keating, Chicago, IL (US); Benny Vejlgaard, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 711 days.

(21) Appl. No.: 17/724,550

(22) Filed: Apr. 20, 2022

(65) Prior Publication Data

US 2022/0345185 A1 Oct. 27, 2022

(30) Foreign Application Priority Data

Apr. 22, 2021 (FI) .................................. 20215471

(51) Int. Cl.
*H04B 7/06* (2006.01)
*H04B 7/0408* (2017.01)
*H04B 7/08* (2006.01)

(52) U.S. Cl.
CPC ......... *H04B 7/0617* (2013.01); *H04B 7/0408* (2013.01); *H04B 7/0652* (2013.01); *H04B 7/086* (2013.01)

(58) Field of Classification Search
None
See application file for complete search history.

(56) References Cited

U.S. PATENT DOCUMENTS

| | | | |
|---|---|---|---|
| 2017/0199269 A1* | 7/2017 | Allen | G01S 5/12 |
| 2020/0025911 A1* | 1/2020 | Rappaport | H01Q 3/26 |
| 2021/0048502 A1* | 2/2021 | Gummadi | G01S 3/72 |
| 2022/0007325 A1* | 1/2022 | Qi | G01S 5/08 |
| 2022/0014949 A1* | 1/2022 | Barbu | G01S 5/021 |
| 2022/0141782 A1* | 5/2022 | Michalopoulos | H04W 4/029 370/350 |
| 2022/0201430 A1* | 6/2022 | Sheng | G01S 5/04 |

* cited by examiner

*Primary Examiner* — Jenkey Van
(74) *Attorney, Agent, or Firm* — McCarter & English, LLP

(57) ABSTRACT

An apparatus may include circuitry configured for providing first data indicative of a first relative angle-of-arrival measurement between a first base station and a second base station, from the position of a user device, based on angle-of-arrival measurements. The apparatus may also include circuitry configured for providing second data indicative of first and second angle-of-departure measurements, each measurement indicative of an angle between the user device and the other base station of the first set of base stations from the position of the respective first and second base stations based on a plurality of beams transmitted from the respective base station to the user device. The apparatus may also include circuitry configured for determining a beam directionality error associated with at least one of the first and second base stations based on the first relative angle-of-arrival measurement and the first and second angle-of-departure measurements.

20 Claims, 8 Drawing Sheets

| Measurement | First rAoA 330 | Second rAoA 340 | Third rAoA 360 |
|---|---|---|---|
| 1 | 31° | 41° | 70° |
| 2 | 30° | 40° | 68° |
| 3 | 31° | 39° | 71° |
| 4 | 29° | 40° | 70° |
| Average | 30.25° | 40° | 69.75° |

FIG. 5

| Measurement | First rAoA 330 | Second rAoA 340 | Third rAoA 360 | First rAoA* = Third rAoA − Second rAoA | Average of First rAoA and First rAoA* |
|---|---|---|---|---|---|
| 1 | 31° | 41° | 70° | 29° | 30° |
| 2 | 30° | 40° | 68° | 28° | 29° |
| 3 | 31° | 39° | 71° | 32° | 31.5° |
| 4 | 29° | 40° | 70° | 30° | 29.5° |
| Average | 30.25° | 40° | 69.75° | 29.75° | 30° |

FIG. 6

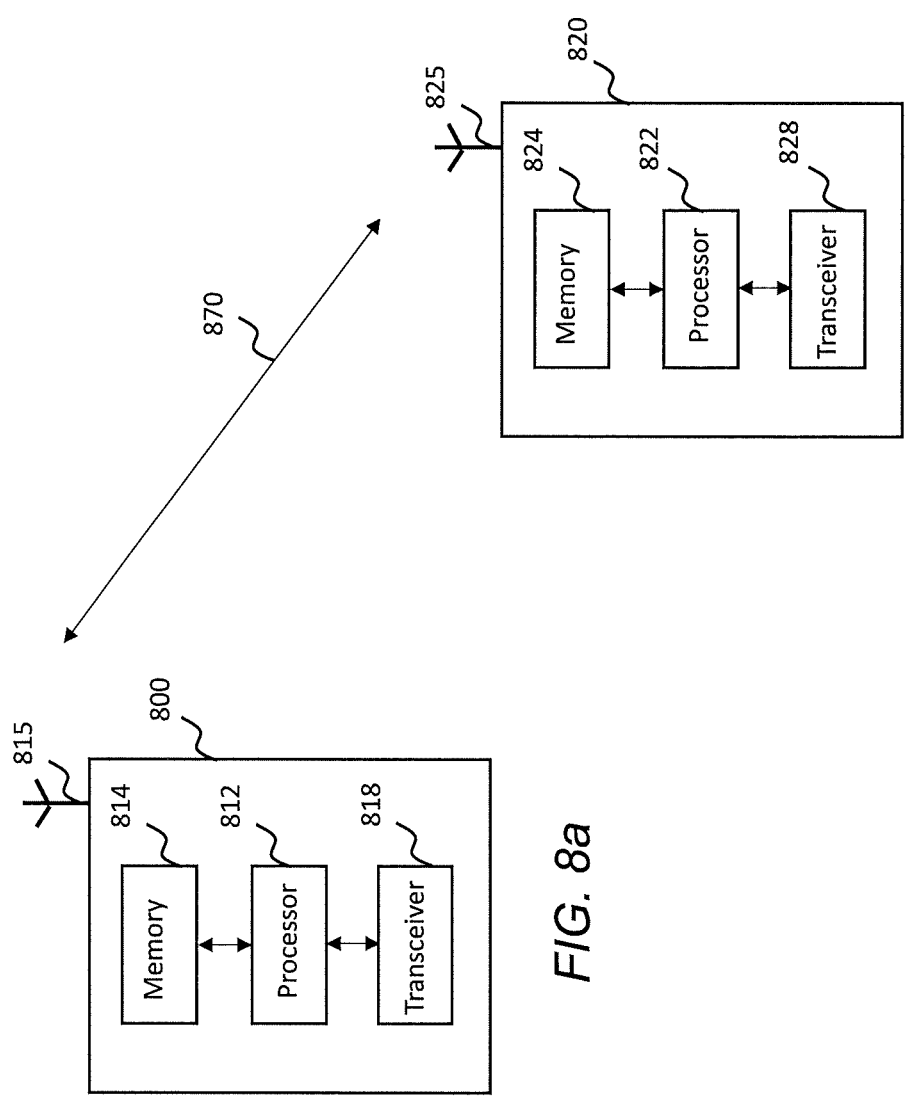

BEAM DIRECTIONALITY ERRORS

FIELD

Example embodiments may relate to systems, methods and/or computer programs for determining beam directionality errors in mobile or wireless telecommunication systems, for example Long Term Evolution (LTE) or fifth generation (5G) radio access technology or new radio (NR) access technology, or other communications systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising means for: providing first data indicative of a first relative angle-of-arrival measurement between a first set of base stations, including a first base station and a second base station, from the position of a user device, based on angle-of-arrival measurements made at the user device; providing second data indicative of first and second angle-of-departure measurements, each measurement indicative of an angle between the user device and the other base station of the first set of base stations from the position of the respective first and second base stations based on a plurality of beams transmitted from the respective base station to the user device; determining a beam directionality error associated with at least one of the first and second base stations based on the first relative angle-of-arrival measurement and the first and second angle-of-departure measurements.

The means for determining the beam directionality error may be configured to determine the beam directionality error based on the sum of the first relative angle-of-arrival measurement and the first and second angle-of-departure measurements equating to a value different than substantially 180 degrees.

The apparatus may further comprise means for determining which of the first and second base stations of the first set of base stations has the beam directionality error.

The means for determining which of the first and second base stations has the beam directionality error may comprise means for: identifying a second set of base stations comprising a selected one of the first set of base stations and a third base station; providing third data indicative of a second relative angle-of-arrival measurement between the second set of base stations from the position of the user device based on angle-of-arrival measurements made at the user device; providing fourth data indicative of third and fourth angle-of-departure measurements, each measurement indicative of an angle between the user device and the other base station of the second set of base stations from the position of the respective base station based on a plurality of beams transmitted from the respective base station to the user device; and determining that the non-selected one of the first set of base stations has the beam directionality error based on the second relative angle-of-arrival measurement and the third and fourth angle-of-departure measurements.

The determining means may be configured to determine that the non-selected one of the first set of base stations has the beam directionality error based on the sum of the second relative angle-of-arrival measurement and the third and fourth angle-of-departure measurements equating to substantially 180 degrees.

The first data may be computed at the user device based on an average of multiple relative angle-of-arrival measurements between the first and second base stations.

The first data may be computed at the user device based on an average of multiple relative angle-of-arrival measurements from different respective sets of base stations.

The multiple relative angle-of-arrival measurements may comprise the first relative angle-of-arrival measurement and a second relative angle-of-arrival measurement from a second set of base stations which comprises a selected one of the first set of base stations and a third base station.

The first data may be computed at the user device based on a weighted average of the multiple relative angle-of-arrival measurements, the weighting based on a quality metric associated with the angle-of-arrival measurements made at the user device.

The weighting may be based on one or more of reference signal received power (RSRP) and reference signal received quality (RSRQ) metrics associated with the angle-of-arrival measurements made at the user device.

The apparatus may comprise the user device.

The apparatus may comprise means for generating the second data based on received reference data from a location management system of a radio network, the reference data indicative of respective geographic locations of the first and second base stations and directional information for the plurality of beams transmitted by each of the first and second base stations.

The apparatus may further comprise means for identifying a non-line-of-sight condition associated with one or more of the beams transmitted by the first and second base stations, and wherein the means for generating the second data is configured to disregard said one or more beams for determining the first and second angle-of-departure measurements.

The apparatus may further comprise means for computing, responsive to determining a beam directionality error for one of the first and second base stations, an updated position of the user device.

The apparatus may further comprise means for computing, responsive to determining a beam directionality error for one of the first and second base stations, a re-calibration signal for re-calibrating the base station that has the error and for transmitting the re-calibration signal to said base station or a location management system associated with said base station.

The apparatus may comprise a location management system of a radio network.

The apparatus may comprise means for receiving the first data from the user device and means for receiving reference signal received power (RSRP) information from the user device for a plurality of beams of each of the first and second base stations for computing the second data indicative of the first and second angle-of-departure measurements.

The apparatus may further comprise means for computing, responsive to determining a beam directionality error for one of the first and second base stations, a re-calibration signal for re-calibrating the base station that has the error and for transmitting the re-calibration signal to said base station.

The apparatus may further comprise means for determining a high or low trust status associated with the first and/or second data, wherein the means for determining the beam directionality error is configured to operate responsive to determining a high trust status, and wherein an alternative means for determining the beam directionality error is configured to operate responsive to determining a low trust status.

The alternative means for determining the beam directionality error may comprise a computational model which has be pre-trained on training data comprising at least angle-of-arrival information and angle-of-departure information associated with a plurality of different beam directionality errors.

According to a second aspect, there is described a method comprising: providing first data indicative of a first relative angle-of-arrival measurement between a first set of base stations, including a first base station and a second base station, from the position of a user device, based on angle-of-arrival measurements made at the user device; providing second data indicative of first and second angle-of-departure measurements, each measurement indicative of an angle between the user device and the other base station of the first set of base stations from the position of the respective first and second base stations based on a plurality of beams transmitted from the respective base station to the user device; determining a beam directionality error associated with at least one of the first and second base stations based on the first relative angle-of-arrival measurement and the first and second angle-of-departure measurements.

Determining the beam directionality error may be based on the sum of the first relative angle-of-arrival measurement and the first and second angle-of-departure measurements equating to a value different than substantially 180 degrees.

The method may further comprise determining which of the first and second base stations of the first set of base stations has the beam directionality error.

Determining which of the first and second base stations has the beam directionality error may comprise: identifying a second set of base stations comprising a selected one of the first set of base stations and a third base station; providing third data indicative of a second relative angle-of-arrival measurement between the second set of base stations from the position of the user device based on angle-of-arrival measurements made at the user device; providing fourth data indicative of third and fourth angle-of-departure measurements, each measurement indicative of an angle between the user device and the other base station of the second set of base stations from the position of the respective base station based on a plurality of beams transmitted from the respective base station to the user device; and determining that the non-selected one of the first set of base stations has the beam directionality error based on the second relative angle-of-arrival measurement and the third and fourth angle-of-departure measurements.

It may be determined that the non-selected one of the first set of base stations has the beam directionality error based on the sum of the second relative angle-of-arrival measurement and the third and fourth angle-of-departure measurements equating to substantially 180 degrees.

The first data may be computed at the user device based on an average of multiple relative angle-of-arrival measurements between the first and second base stations.

The first data may be computed at the user device based on an average of multiple relative angle-of-arrival measurements from different respective sets of base stations.

The multiple relative angle-of-arrival measurements may comprise the first relative angle-of-arrival measurement and a second relative angle-of-arrival measurement from a second set of base stations which comprises a selected one of the first set of base stations and a third base station.

The first data may be computed at the user device based on a weighted average of the multiple relative angle-of-arrival measurements, the weighting based on a quality metric associated with the angle-of-arrival measurements made at the user device.

The weighting may be based on one or more of reference signal received power (RSRP) and reference signal received quality (RSRQ) metrics associated with the angle-of-arrival measurements made at the user device.

The method may be performed by the user device.

The method may comprise generating the second data based on received reference data from a location management system of a radio network, the reference data indicative of respective geographic locations of the first and second base stations and directional information for the plurality of beams transmitted by each of the first and second base stations.

The method may further comprise identifying a non-line-of-sight condition associated with one or more of the beams transmitted by the first and second base stations, and wherein generating the second data may comprise disregarding said one or more beams for determining the first and second angle-of-departure measurements.

The method may further comprise computing, responsive to determining a beam directionality error for one of the first and second base stations, an updated position of the user device.

The method may further comprise computing, responsive to determining a beam directionality error for one of the first and second base stations, a re-calibration signal for re-calibrating the base station that has the error and for transmitting the re-calibration signal to said base station or a location management system associated with said base station.

The method may be performed at a location management system of a radio network.

The method may comprise receiving the first data from the user device and receiving reference signal received power (RSRP) information from the user device for a plurality of beams of each of the first and second base stations for computing the second data indicative of the first and second angle-of-departure measurements.

The method may further comprise computing, responsive to determining a beam directionality error for one of the first and second base stations, a re-calibration signal for re-calibrating the base station that has the error and for transmitting the re-calibration signal to said base station.

The method may further comprise determining a high or low trust status associated with the first and/or second data, wherein determining the beam directionality error may be responsive to determining a high trust status, and wherein an alternative method for determining the beam directionality error is configured to operate responsive to determining a low trust status.

The alternative method for determining the beam directionality error may comprise use of a computational model which has be pre-trained on training data comprising at least angle-of-arrival information and angle-of-departure information associated with a plurality of different beam directionality errors.

According to a third aspect, there is provided a computer program product comprising a set of instructions which, when executed on an apparatus, is configured to cause the apparatus to carry out the method of any preceding method definition.

According to a fourth aspect, there is provided a non-transitory computer readable medium comprising program instructions stored thereon for performing a method, comprising: providing first data indicative of a first relative angle-of-arrival measurement between a first set of base stations, including a first base station and a second base station, from the position of a user device, based on angle-of-arrival measurements made at the user device; providing second data indicative of first and second angle-of-departure measurements, each measurement indicative of an angle between the user device and the other base station of the first set of base stations from the position of the respective first and second base stations based on a plurality of beams transmitted from the respective base station to the user device; determining a beam directionality error associated with at least one of the first and second base stations based on the first relative angle-of-arrival measurement and the first and second angle-of-departure measurements.

The program instructions of the fourth aspect may also perform operations according to any preceding method definition of the second aspect.

According to a fifth aspect, there is provided an apparatus comprising: at least one processor; and at least one memory including computer program code which, when executed by the at least one processor, causes the apparatus: to provide first data indicative of a first relative angle-of-arrival measurement between a first set of base stations, including a first base station and a second base station, from the position of a user device, based on angle-of-arrival measurements made at the user device; to provide second data indicative of first and second angle-of-departure measurements, each measurement indicative of an angle between the user device and the other base station of the first set of base stations from the position of the respective first and second base stations based on a plurality of beams transmitted from the respective base station to the user device; and to determine a beam directionality error associated with at least one of the first and second base stations based on the first relative angle-of-arrival measurement and the first and second angle-of-departure measurements.

The computer program code of the fifth aspect may also perform operations according to any preceding method definition of the second aspect.

BRIEF DESCRIPTION OF THE DRAWINGS

Example embodiments will now be described by way of non-limiting example, with reference to the accompanying drawings, in which:

FIG. 5 is a table indicating how relative angle-of-arrival measurements may be based on an average of multiple measurements, in accordance with some example embodiments;

FIG. 6 is a table similar to FIG. 5 and which additionally may involve averaging across angles, in accordance with some example embodiments;

FIG. 8a is a block diagram of an apparatus, according to an embodiment; and FIG. 8b is a block diagram of an apparatus, according to another embodiment.

DETAILED DESCRIPTION

Figure 1A:
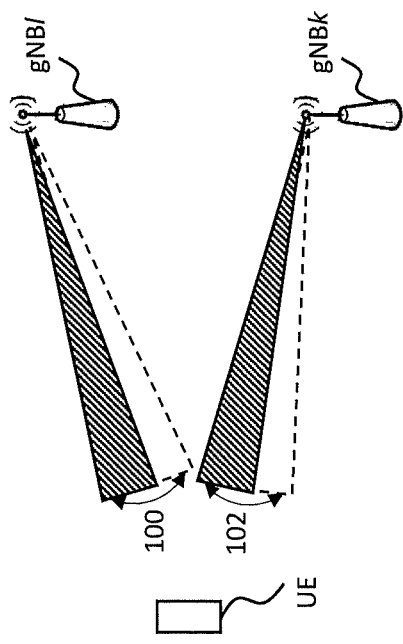
FIG. 1a is a schematic diagram illustrating an example of orientation errors at two network nodes.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for calibrating beam orientation errors for improved positioning is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

In NR, certain positioning or geo-location features may include use of a downlink angle of departure method (DL-AoD). The DL-AoD method may function by having one or more network nodes (e.g., gNBs) transmit downlink positioning reference signals (DL PRSs) that are received at a user equipment (UE) or user device. The UE may then measure a reference signal received power (RSRP) of the DL PRS and may report the measured values to another network node (e.g., a location management system, which may be known in particular real-world networks as a location management function (LMF) or similar). The LMF may use the DL PRS RSRP to estimate the AoD from each gNB and may use the AoD to estimate the UE position via triangulation. The LMF may use information on the beam direction provided by the gNB(s). DL PRSs may include support for beam formed signals so that the AoD can be estimated based on the beam direction. Although some embodiments herein may be described using a DL PRS, it will be understood that another type of reference signal used for positioning purposes (e.g., CSI-RS, SSB, and/or the like) may be used.

Figure 1C:
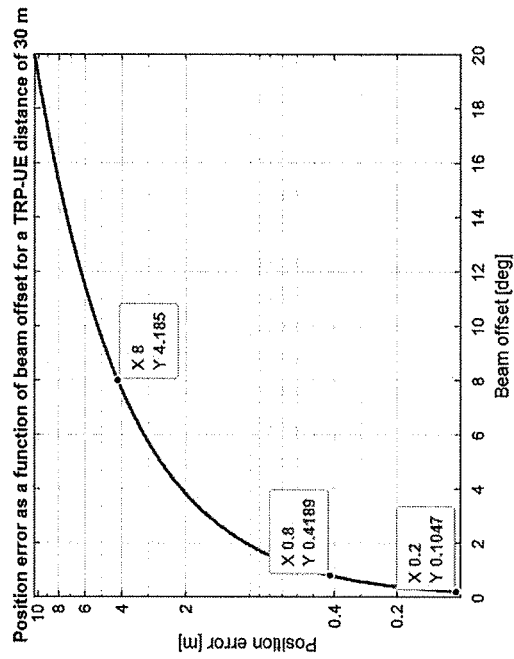
FIG. 1c is a graph indicating how an orientation error may cause position errors.
Figure 1B:
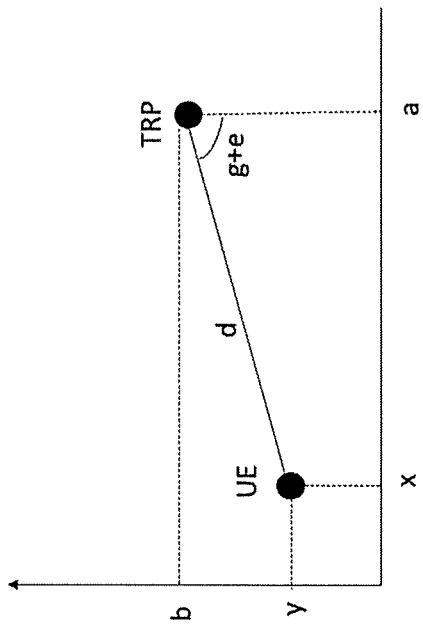
FIG. 1b is a schematic diagram illustrating another example of on orientation error at a network node.

Positioning algorithms may rely on the acquisition and reporting of different delay or angular metrics that implicitly characterize the distance between the UE and a gNB. Time of arrival (ToA) methods may rely on the detection of the delay of a line-of-sight (LoS) component. Angle-based methods (e.g., angle of arrival (AOA), or DL-AoD) may use the AOA or AoD from multiple gNBs in order to perform multilateration or triangulation to determine the UE position. Angle-based positioning may, however, be sensitive to orientation uncertainties at the gNB. Specifically, each gNB may introduce orientation errors, or beam directionality errors, in beamed transmissions. That is, each beam may be sent under an angle characterized by an unknown error $\Phi$. Such a situation is illustrated in FIG. 1$a$, which illustrates an example of beam directionality errors at two network nodes (e.g., gNBs). In particular, the beam directionality errors are illustrated at 100 and 102 for gNBs l and k, respectively, as the difference between the grey beams and the dashed beams.

For example, consider a scenario depicted in FIG. 1$b$. A transmission point (TRP), e.g. a gNB, is located at known position [a, b] and a UE at unknown location [x, y]. The distance between the TRP and the UE is d. The ideal AoD at the gNB is g, i.e. if the beam would be perfectly tuned to the AoD g. Due to a beam offset error e however, in reality, the AoD is (g+e). An LMF may compute the estimated positions [$\hat{x}$, $\hat{y}$] using the distance d and the ideal AoD, i.e. what the gNB believes the AoD should be, as [$\hat{x}$, $\hat{y}$]=[a−d sin(g), b−d cos(g)].

However, the actual position is [x,y]=[a−d sin(g+e), b−d cos(g+e)] because the actual AoD is in fact (g+e). The Euclidian distance between the actual and the estimated location, i.e. $E=\sqrt{(x-\hat{x})^2+(y-\hat{y})^2}$ measures the position error due to the beam offset error e and it is $E=d\sqrt{2}\sqrt{1-\cos(e)}$.

An example of how the beam error e may impact the position error E is given in FIG. 1$c$, for a distance d=30 m. As is seen, even if the beam offset error e is the sole error source, a small beam offset or orientation error would cause 10-40 cm of positioning error. This may not be acceptable for high-accuracy use cases, which are prone to errors stemming not only for beam offsets.

Some embodiments described herein may provide for determining a beam directionality error (i.e. beam offset error as mentioned above) associated with one or more network nodes, e.g. base stations or gNBs. This may involve determining an existence of a beam directionality error at the one or more network nodes and, in some embodiments, determination of the amount of offset.

Some example embodiments may also provide for updating a position of a user device, e.g. UE, based on the determined beam directionality error.

Some example embodiments may also provide for re-calibrating, or correcting, one or more network nodes, e.g. base stations or gNBs, based on the determined beam directionality error for the respective base station or gNBs.

In this way, certain embodiments may provide for identification and correction of measurements related to, for example, AoD, thereby improving accuracy of position estimates for a UE. Additionally, or alternatively, in this way, certain embodiments may provide for correction of DL beam (e.g., DL PRS) coverage gaps, thereby improving beam coverage in a network. These improvements may conserve processing resources (e.g., of a UE and/or a network node) and/or network resources that would otherwise be consumed through less accurate position estimates and/or worse beam coverage.

As used herein, the term base station is a term that may cover any form of transmission point (TP) or transmission-reception point (TRP) and, as such, examples described herein refer to gNBs as examples. It should be appreciated that example embodiments may be applicable to any form of base station within the above definition.

Example embodiments may provide operations which may be implemented at an entity for calculating a position of a mobile node, such as a UE which will be used herein as the main example. For example, the operations may be performed at the UE itself, or at a network entity such as the LMF. In either case, the location of the UE does need not be known or even estimated in advance.

Figure 2:
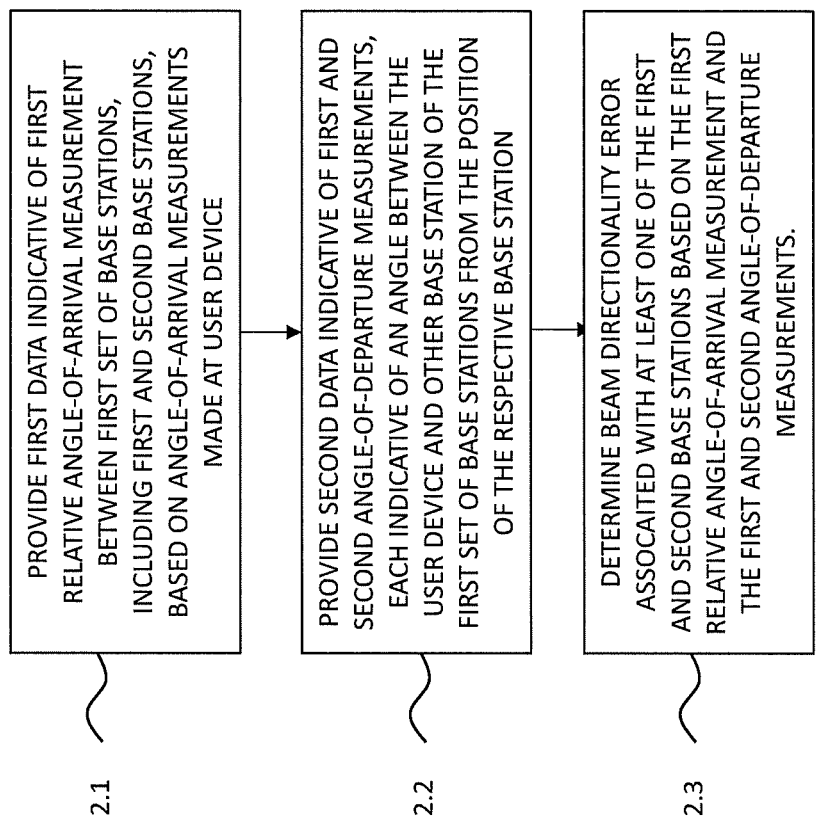
FIG. 2 is a flow diagram showing processing operations that may be performed in accordance with some example embodiments.

FIG. 2 is a flow diagram of operations according to one or more example embodiments. The operations may be performed in hardware, software, firmware or a combination thereof. The numbering of operations is not necessarily indicative of the order of processing and, for example, some operations may be performed in a different order and/or in parallel. The term base stations is used as a generic term which covers, as implied above, gNBs and TRPs.

Referring to FIG. 2, a first operation 2.1 may comprise providing first data indicative of a first relative angle-of-arrival (AoA) measurement between a first set of base stations, including a first base station and a second base station, from the position of a user device, based on angle-of-arrival measurements made at the user device.

A second operation 2.2 may comprise providing second data indicative of respective first and second angle-of-departure measurements, each measurement indicative of an angle between the user device and the other base station of the first set of base stations from the position of the respective base station based on a plurality of beams transmitted from the respective base station to the user device.

A third operation 2.3 may comprise determining a beam directionality error associated with at least one of the first and second base stations based on the first relative angle-of-arrival measurement and the first and second angle-of-departure measurements.

The term "providing" may comprise receiving or generating.

Figure 3:
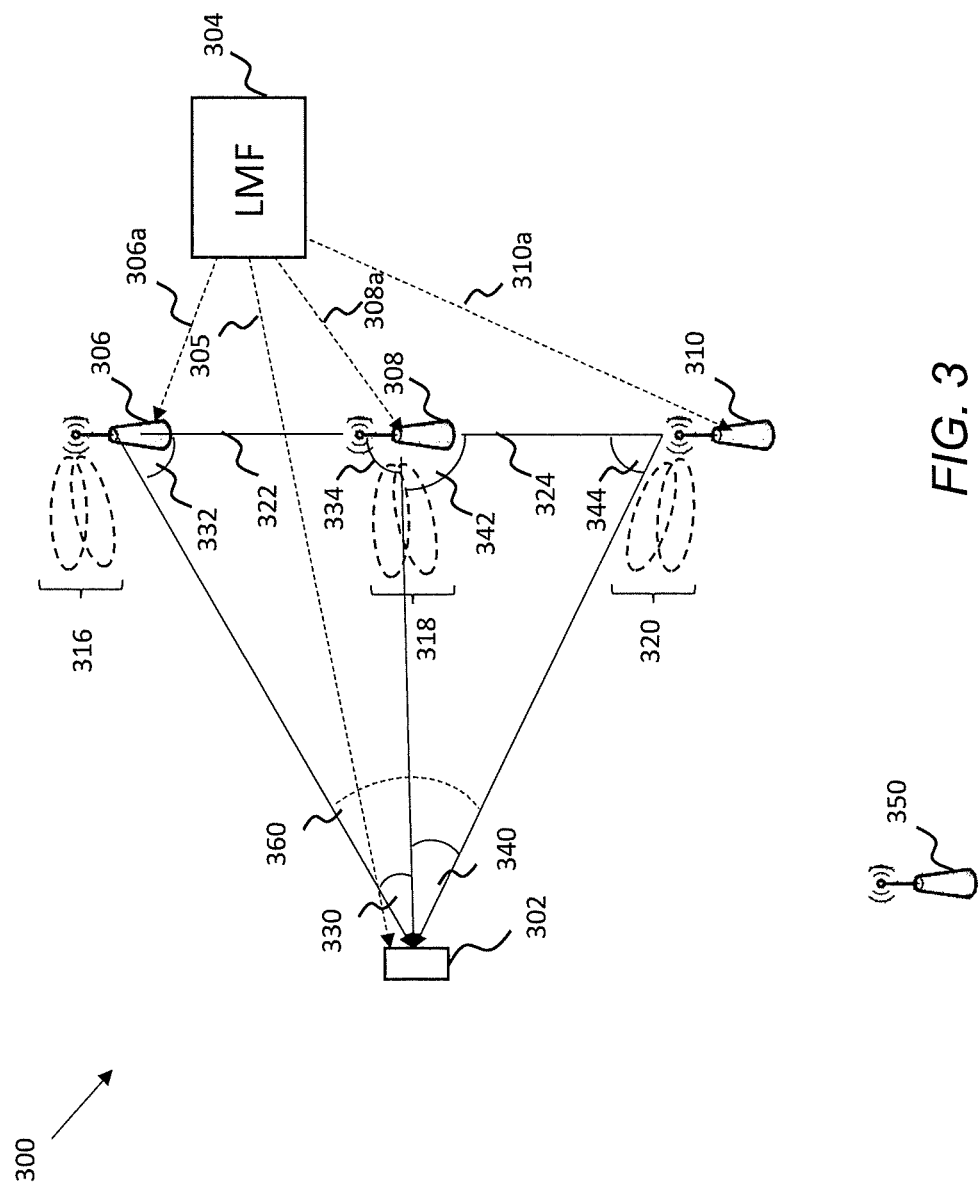
FIG. 3 is a schematic diagram of a radio network scenario to which example embodiments may be applied.

FIG. 3 shows a practical scenario 300 which may utilize the FIG. 2 operations and will now be described.

Referring to FIG. 3 there is shown a UE 302, an LMF 304 which may be in signal communication with the UE via a link or channel 305, and first, second and third gNBs 306, 308, 310 via respective links or channels 306a, 308a, 310a. A further, fourth gNB 350 is shown and will be briefly mentioned later on. Each of the first, second and third gNBs 306, 308, 310 may transmit radio signals according to any radio access network standard using a plurality of beams, generally indicated 316, 318, 320 for the respective first, second and third gNBs.

According to an example embodiment, the position (geolocation) of the first, second and third gNBs 306, 308, 310 is known by the LMF 304 or is accessible to the LMF. For example, the positions may be stored as reference data at the LMF 304 or at another location to which the LMF has access. Accordingly, a straight-line path (hereafter "path") in terms of direction and distance between each pairwise combination of the first, second and third gNBs 306, 308, 310 is known, or can be computed by the LMF 304 or is made accessible to the LMF. A first straight line path 322 is shown between the first and second gNBs 306, 308 and a second straight line path 324 is shown between the second and third gNBs 308, 310. Although not shown, a third straight line path may be known between the first and third gNBs 306, 310.

Although not shown, there may be additional gNBs, such as the fourth gNB 350, in a practical radio access network and hence the LMF 304 may store additional reference data in terms of positions and paths between different pairs of gNBs.

The UE 302 may be configured to compute first data indicative of a first relative AoA measurement 330 between, for example, the first and second base stations 306, 308. By relative AoA measurement 330, it is meant the angle measured from the position of the UE 302, for example by first making an AoA measurement by the UE with respect to signals received from the first base station 306 and a second AoA measurement with respect to signals received from the second base station 308. The difference between the second and first AoA measurements may be the first relative AoA measurement 330.

In another example, the relative AoA measurement 303 may be determined by making a first AoA measurement by the UE 302 with respect to signals received from the first base station 306 and a UE reference direction, e.g. north, and a second AoA measurement with respect to signals received from the second base station 308 and the same UE reference direction. As in the above case, the difference between the second and first AoA measurements may be the first relative AoA measurement 330.

AoA measurements made by the UE 302 may use conventional methods and may use the above-mentioned DL PRS or SSB reference signals or similar. Relative AoA measurements are not generally dependent on the orientation or heading of the UE 302. In some example embodiments, to be mentioned below, an average or weighted average of multiple relative AoA measurements may be used to improve accuracy of the relative AoAs used in operations described herein.

The UE 302 may also be configured to compute second data. The second data may be indicative of respective first and second angle-of-departure (hereafter AoD) measurements 332, 334. The measurements need not be computed at the same time. The first AoD measurement 332 may be indicative of the angle, from the position of the first gNB 306, between the UE 302 and the second gNB 308. The second AoD measurement 334 may be indicative of the angle, from the position of the second gNB 308, between the UE 302 and the first gNB 306.

To estimate what are referred to here as "AoD measurements" may involve, for example, determining an AoD of the UE 302 from the position of, for example, the first gNB 306 with respect to a reference direction, e.g. north. Then, based on knowledge of the angle from the position of the first 306, between the second gNB 308 and the same reference direction (an angle that may be known from network planning) it is possible to estimate what we refer first AoD measurement 332. The same process may be used to determine the second AoD measurement 334 and so on.

AoD measurements made by the UE 302 may use conventional methods and may use the above-mentioned DL PRS RSRP measurements per beam per gNB, in this case for the first and second gNBs 306, 308. The UE 302 may, for this purpose, receive over the link 305 AoD reference data from the LMF 304 which may be indicative of PRS measurement assistance data (e.g. data indicative of time-frequency resources for decoding the PRSs), geo-locations of at least the first and second gNBs 306, 308 and spatial direction information such as elevation and azimuth angles per beam per gNB. In some example embodiments, the AoD reference data may be measured for all gNBs of the particular radio access network which the LMF 304 is associated with, including, for example, the third gNB 310. In some example embodiments, to be mentioned below, an average or weighted average of multiple AoD measurements may be used to improve accuracy of the AoD measurements used in operations described herein.

The UE 302 may then determine a beam directionality error associated with at least one of the first and second gNBs 306, 308 based on the first and second data, e.g. (i) the first relative AoA measurement 330, (ii) the first AoD measurement 332 and (iii) the second AoD measurement 334. The determination of a beam directionality error may be based on any suitable rule or criterion. One example is to perform a "check of angles" of the triangle formed by straight lines interconnecting the UE 302 and the first and second gNBs 306, 308. For example, if the first relative AoA measurement 330, the first AoD measurement 332 and the second AoD measurement 334 do not sum to 180 degrees, substantially, then the existence of a beam directionality error for at least one of the first and second gNBs 306, 308 may be determined. The term "substantially" in this context means that some predetermined tolerance either side of 180 degrees may be built-in to the determination, but in some cases the requirement may be strictly 180 degrees.

Determining which of the first and second gNBs 306, 308 has the beam directionality error may be straightforward if, for example, one of the first and second AoD measurements 332, 334 is known to be accurate. For example, if the second gNB 308 has been involved in a previous round or iteration of the above third operation 2.3 (in a pairwise combination with a different gNB) and the check of angles meets the predetermined rule, e.g. sums to substantially 180 degrees, then it may be assumed that the beam directionality error is associated with the first gNB 306. Additionally, or alternatively, the second gNB 308 might be a "reference gNB" which is known to be correctly calibrated.

Additionally, or alternatively, another pairwise combination of gNBs, i.e. a second set of gNBs may be evaluated in the above manner. One of the second set of gNBs may be a selected one of the first and second gNBs 306, 308 and another may be a different gNB, such as the third gNB 310. If the predetermined rule is met for the second set of gNBs, then it can be determined that the beam directionality error is associated with the other, non-selected one of the first and second gNBs 306, 308. If not met, the process can be repeated for another set of gNBs. The process can be repeated for multiple or all pairwise combinations of gNBs until it is determined which are in error and which are not.

Figure 4:
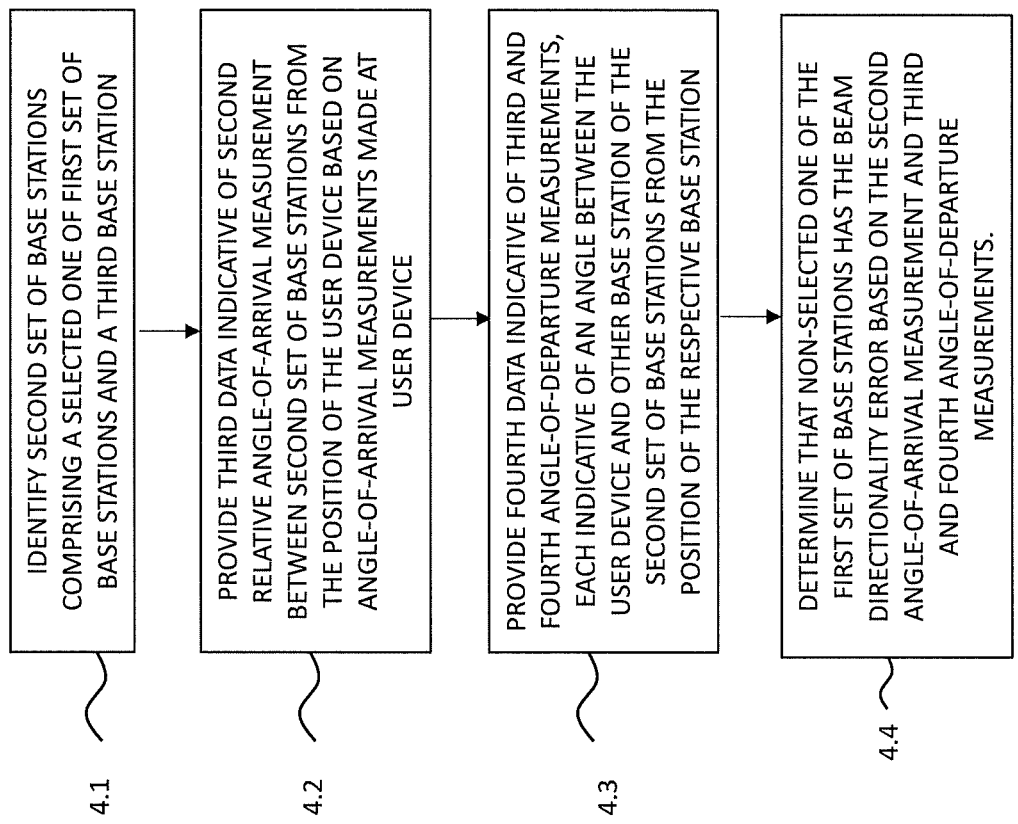
FIG. 4 is a further flow diagram showing processing operations that may be performed in accordance with some example embodiments.

For example, FIG. 4 is a flow diagram of operations according to one or more example embodiments. The operations may be performed in hardware, software, firmware or a combination thereof. The numbering of operations is not necessarily indicative of the order of processing and, for example, some operations may be performed in a different order and/or in parallel. The term base stations is used as a generic term which covers, as implied above, gNBs and TRPs.

Referring to FIG. 4, a first operation 4.1 may comprise identifying a second set of base stations comprising a selected one of the first set of base stations and a third base station.

A second operation 4.2 may comprise providing second data indicative of a second relative angle-of-arrival measurement between the second set of base stations from the position of the user device based on angle-of-arrival measurements made at the user device.

A third operation 4.3 may comprise providing fourth data indicative of respective third and fourth angle-of-departure measurements, each measurement indicative of an angle between the user device and the other base station of the second set of base stations from the position of the respective base station, e.g. based on a plurality of beams transmitted from the respective base station to the user device.

A fourth operation 4.4 may comprise determining that the non-selected one of the first set of base stations has the beam directionality error based on the second relative angle-of-arrival measurement and the third and fourth angle-of-departure measurements, for example, if the predetermined rule is met in the fourth operation 4.4.

Otherwise, another pairwise set of base stations may be identified, and the FIG. 4 process repeated with that other set becoming the second set.

The term "providing" may comprise receiving or generating.

For example, with reference to the FIG. 3 scenario 300 again, if the second set of base stations comprises the second gNB 308 and the third gNB 310, it may be determined based on a second relative AoA measurement 340, and third and fourth AoD measurements 342, 344 whether the predetermined rule is met, e.g. if they sum to substantially 180 degrees. If so, then it can be determined that the first gNB 306 has the beam directionality error. If not, then another pairwise combination can be identified and the FIG. 4 process repeated. For example, the other pairwise combination may comprise the third gNB 310 and a fourth gNB 350 and so on.

Having identified which of the gNBs 306, 308, 310 has the beam directionality error, the UE 302 may, for example, correct its current geo-location estimate based on a determined offset of beam directionality error, which may be based on the amount of departure from 180 degrees. In other words, the UE 302 may update its AoD-based geo-location to account for the amount of beam directionality error.

Additionally, or alternatively, the UE 302 may report in one or more signals to the LMF 304 the particular gNB(s) 306, 308, 310 that has or have the beam directionality error(s) and amount of offset.

The LMF 304 may re-calibrate the determined gNB(s) in terms of beam directionality based on the received one or more signals. Alternatively, or additionally, the LMF 304 may record this information locally.

In some example embodiments, it is the LMF 304 which may perform the FIGS. 2 and 4 operations rather than the UE 302.

For example, the UE 302 may report in one or more signals to the LMF 304 the relative AoA measurement(s) 320, 340 as described above.

For example, the UE 302 may report in one or more signals to the LMF 304 the DL PRS RSRP measurements per beam per gNB, in order that the LMF may calculate the AoD measurements as described above.

For example, the LMF 304 may perform the determination of beam directionality errors based on the relative AoA and AoD measurements.

For example, the LMF 304 may re-calibrate the determined gNB(s) in terms of beam directionality based on the determined beam directionality errors and amount(s) of correction required. Alternatively, or additionally, the LMF 304 may record this information locally.

The FIG. 2 operations may be performed periodically, according to a schedule and/or may be triggered by one or more events. For example, the UE 302 or LMF 304 may trigger the FIG. 2 and FIG. 4 operations based on a beam directionality detection algorithm which may be based on detecting, or being notified of, low-quality AoD positioning errors experienced by one or more UEs.

In the case that the LMF 304 performs the FIG. 2 and FIG. 4 operations, the LMF may select the UE 302 or a plurality of UEs 302 from which the relative AoA measurement(s) and DL PRS RSRP measurements are received. The UE 302 or UEs may be referred to as reference UE(s). The selection of one or more reference UEs may be based on how close the UE(s) is or are to the relevant gNBs which may be based on a rough geo-location estimate. Location of the exact geo-location of a reference UE is not required, but given even an estimate, it may be beneficial to select the reference UE(s) which is or are closest to the relevant gNBs, as this is expected to give more accurate AoA measurement(s). Alternatively, or additionally, selection may be based on the DL PRS RSRP measurements received from one or more UEs, with the UE(s) providing the strongest measurement(s) selected. Alternatively, or additionally, selection may be based on the AoD measurement quality from a reference or serving cell gNB. In this way, the AoD from the reference or serving cell gNB may be seen as a more trustworthy "anchor point" for the algorithm.

In some example embodiments, the relative AoA measurements referred to above may be based on an average of multiple relative AoA measurements. This may improve accuracy as the relative AoA measurements converge to a true value over time.

FIG. 5 shows a table 500 indicating multiple measurements (e.g. at four different times) for the first relative AoA 330, the second relative AoA 340 and a third relative AoA measurement 360. The third relative AoA measurement, as shown in FIG. 3, is the angle between the first and third gNBs 306, 310 and provides an alternative measure to summing the first and second relative AoAs 330, 340. The final row of the table 500 is the average value.

It will be seen that, after four measurements, the average first relative AoA 330 is 30.25 degrees, the average second relative AoA 340 is 40 degrees and the average third relative AoA 360 is 69.75 degrees. If the actual values are, respectively, 30 degrees, 40 degrees and 70 degrees, it can be seen how the average values converge towards the actual values.

In some example embodiments, the relative AoA measurements, such as those shown in the table 500 of FIG. 5, may be weighted based on a confidence factor. For example, the confidence factor may be based on quality estimates associated with AoA measurements used to determine the relative AoA measurements.

For example, the quality estimates may be signal quality estimates, e.g. based on DL-RSRP and/or DL-RSRQ metrics associated with the AoA measurements at a given measurement time. If above a certain DL-RSRP or DL-RSRQ threshold, then a particular relative AoA measurement may be given a confidence factor of one. If below the certain threshold, then a particular relative AoA measurement may be given a confidence factor of zero, and consequently is not used in determining the average value for the respective relative AoA measurement. Other weightings, in between zero and one, may be used.

The confidence factor may also be based on the variance for relative AoA measurements.

In this way, the final row of the table 500 may be considered more reliable.

FIG. 6 shows another table 600 indicating multiple measurements (e.g. at four different times) for the first relative AoA 330, the second relative AoA 340 and the third relative AoA measurement 360. The table 600 is similar to the table 500 shown in FIG. 5 but, in this case, also involves averaging across angles (left to right). A fifth column 602 represents an alternative value for the first relative AoA 330 based on subtracting the second relative AoA 340 from the third relative AoA 360. A sixth column 604 represents the average of the measured first relative AoA 330 and the alternative value indicated in the fifth column 602. The final row 606 of the sixth column 604 therefore indicates the average across both multiple time-based measurements and across angles, and may be considered an even more accurate measure of the first relative AoA 330.

In some example embodiments, the same process can be performed for the second relative AoA 340 and so on.

In some example embodiments, the relative AoA measurements, such as those shown in the table 600 of FIG. 6, may be weighted based on a confidence factor as already explained in relation to FIG. 5. For example, the confidence factor may be based on quality estimates associated the AoA measurements used to determine the relative AoA measurements and the average value.

In some example embodiments, the AoD measurements referred to above may also be averaged and/or weighted based on a confidence factor, e.g. based on DL-RSRP and/or RSRQ values and/or variance.

In some example embodiments, the use of a particular relative AoA measurement, such as any of those indicated in FIG. 3 for the FIGS. 2 and 4 operations, may only take place if there is a high confidence attached to a particular relative AoA measurement and/or AoD measurement.

In the case where the LMF 304 performs the FIGS. 2 and 4 operations, the UE 302 may send to the LMF a trust report indicating whether a low or high confidence (or trust) is associated with the AoA measurements being transmitted. This indicator may be the SNR associated with the signal(s) based on which the AoA measurement was determined, or the variance thereof.

In some example embodiments, a low trust report from the UE 302 may cause the LMF 304 to perform an alternative estimation method or solve an alternative estimation problem, for example in which errors of relative AoAs are accounted for, to be distinguishable from beam directional errors. For example, the LMF 304 may use trust reports from multiple UEs and formulate one estimation method or problem.

In some example embodiments, the UE 302 may be configured to report to the LMF 304 a plurality of relative AoA values using different pairs of downlink beams. This may be performed in order to allow the LMF 304 to perform some further processing or filtering of the relative AoA values. For example, if the LMF 302 obtains knowledge of a line of sight (LoS) or non line of sight (NLoS) status for certain beams, the LMF 302 may still correct the beam directionality errors, by using the correct relative AoAs based on the LoS measurements on not the NLoS measurements. This may be done also to create a weighted average of relative AoA values, similar to how the LMF 304 may use multiple beam DL-RSRP values to find a weighted estimate of AoD measurements.

In the case where the UE 302 performs the FIGS. 2 and 4 operations, the UE may obtain LoS knowledge of certain beams (either locally or by network indication) and use that knowledge to improve, for example, the AoD measurements. For example, the UE 302 may determine that one beam, which is spatially in-between two other beams (from the perspective of a particular gNB) has a NLoS status and therefore may remove that DL-RSRP measurement from the weighted averaging calculation which is used to arrive at an AoD measurement. Similarly, multiple relative AoA measurements can be used by the UE 302 to refine the main procedure described above.

Returning to the case where the LMF 304 performs the FIGS. 2 and 4 operations, in the case where the LMF 304 receives a low trust report from the UE 302, e.g. due to a high variance for AoA measurements, then some example embodiments may require the LMF not to infer beam directionality errors for a particular gNB based only on measurements associated with said report.

For example, in such a situation, the LMF 304 may first build a database of trust reports from the UE 302, or multiple UEs (e.g. reference UEs as mentioned above), and use a data-driven approach which may involve use of a computational model. The computational model, when trained, may estimate beam offsets for one or more given gNBs when presented with new data at the input.

An optimization problem may be formulated in order to estimate an amount of beam directionality error (e.g. an offset) which may be based on one or more of:

UE estimates of the AoAs and the accuracies of the estimates, e.g. reported as a mean and variance for the relative AoAs estimates;

LoS probabilities defined as the probability that a channel has a LoS status;

DL-RSRPs;

number of detected multipath components (which may be referred to as channel sparsity);

timestamp of each measurement; and/or corresponding AoD values (calculated at the LMF 304).

The beam offset estimate may be presented as a pair of values, e.g. (mean, variance), which may be referred to as a soft estimate, or as a scalar (mean) value, which may be referred to as a hard estimate.

Such a method can be implemented with tools from supervised learning, e.g. deep neural networks (DNN), and a cost function that measures the error between the true and estimated offset, e.g. the mean squared error (MSE) or cross-entropy (CE) loss. Such a DNN may have N>1 hidden layers and use, for example, a linear output activation function. Alternative to a DNN, a convolutional neural network (CNN) may be used.

Figure 7:
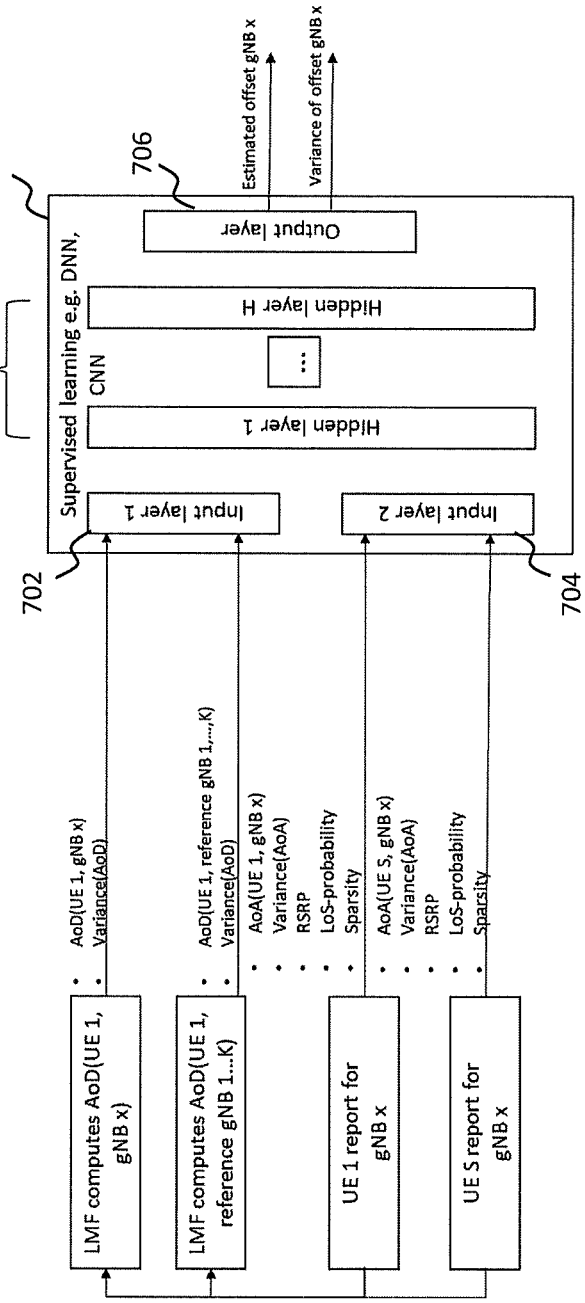
FIG. 7 is a schematic block diagram of an apparatus or architecture which may employ a machine learning approach for estimation of orientation errors, in accordance with some example embodiments.

FIG. 7 is a schematic block diagram of an apparatus 700, e.g. an architecture, which may employ a machine-learning (ML) approach for estimation of offsets. As will be seen, the apparatus 700 may comprise first and second input layers 702, 704, an output layer 706 and one or more hidden layers 708. The apparatus 700 may be employed responsive to the LMF 304 receiving a low trust report.

Input data, from sources generally represented using reference numerals may be organized in a vector form, where columns may represent different time instances (time-stamps) of when each measurement was obtained e.g. AOD (UE 1, gNB x)=[$AOD_{1,x}(t_1)$, . . . , $AOD_{1,x}(t_F)$].

As seen from FIG. 7, input data may be divided and fed to the first and second input layers 702, 704, the first input layer associated with AoD measurements (performed at the LMF 304) and the second layer associated with AoA measurements (performed at UEs). The division may be based on the fact that the measurements have different sources, and therefore different accuracies. The outputs of the first and second input layers 702, 704 may then be combined into a first hidden layer of the one or more hidden layers 708.

The apparatus 700 may be pre-trained using a simulated environment, e.g. link level simulator, ray-tracing tools, etc. The apparatus 700 may optionally be calibrated periodically, when deployed in the field. To generate labelled training data via simulations, the above input features may be collected and labelled with the true beam offset and the apparatus trained using conventional techniques, such as the supervised learning approach mentioned above.

For example, this may be realized by:
deploying K UEs, e.g. K=1000, in a radio access network at random locations;
generating channel impulse responses (CIRs) between each UE-gNB pair with variable LoS status probabilities (for example, a LoS status probability may be drawn from a uniform distribution [0, 1]);
using the CIRs to extract AoA and AoD values for the dominant component per CIR; and
adding a random error (EPS) on the AoA and AoD values, where EPS may be drawn from a uniform distribution of [0, M] degrees, where, for example, M={1, 10}.

Following the training, the apparatus 700 may be configured in an inference mode of operation to receive corresponding input data from one or more reference UEs, the resulting output data being an indication of the estimated offset for a given gNB and possibly the variance of the offset for the given gNB.

FIG. 8a illustrates an example of an apparatus 800 according to an embodiment. In an embodiment, apparatus 800 may be a node, host, or server in a communications network or serving such a network. For example, apparatus 800 may be a network node, satellite, base station, a Node B, an evolved Node B (eNB), 5G Node B or access point, next generation Node B (NG-NB or gNB), a LMF, and/or a WLAN access point, associated with a radio access network, such as a LTE network, 5G or NR. In example embodiments, apparatus 800 may be an eNB in LTE or gNB in 5G.

It should be understood that, in some example embodiments, apparatus 800 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 800 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 800 may include components or features not shown in FIG. 8a.

As illustrated in the example of FIG. 8a, apparatus 800 may include a processor 812 for processing information and executing instructions or operations. Processor 812 may be any type of general or specific purpose processor. In fact, processor 812 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 812 is shown in FIG. 8a, multiple processors may be utilized according to other embodiments. For example, it should be understood that, in certain embodiments, apparatus 800 may include two or more processors that may form a multiprocessor system (e.g., in this case processor 812 may represent a multiprocessor) that may support multiprocessing. In certain embodiments, the multiprocessor system may be tightly coupled or loosely coupled (e.g., to form a computer cluster).

Processor 812 may perform functions associated with the operation of apparatus 800, which may include, for example, precoding of antenna gain/phase parameters, encoding and decoding of individual bits forming a communication message, formatting of information, and overall control of the apparatus 800, including processes related to management of communication resources.

Apparatus 800 may further include or be coupled to a memory 814 (internal or external), which may be coupled to processor 812, for storing information and instructions that may be executed by processor 812. Memory 814 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 814 can be comprised of any combination of random access memory (RAM), read only memory (ROM), static storage such as a magnetic or optical disk, hard disk drive (HDD), or any other type of non-transitory machine or computer readable media. The instructions stored in memory 814 may include program instructions or computer program code that, when executed by processor 812, enable the apparatus 800 to perform tasks as described herein.

In an embodiment, apparatus 800 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 812 and/or apparatus 800.

In some embodiments, apparatus 800 may also include or be coupled to one or more antennas 815 for transmitting and receiving signals and/or data to and from apparatus 800. Apparatus 800 may further include or be coupled to a transceiver 818 configured to transmit and receive information. The transceiver 818 may include, for example, a plurality of radio interfaces that may be coupled to the antenna(s) 815. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 818 may be configured to modulate information on to a carrier waveform for transmission by the antenna(s) 815 and demodulate information received via the antenna(s) 815 for further processing by other elements of apparatus 800. In other embodiments, transceiver 818 may be capable of transmitting and receiving signals or data directly. Additionally or alternatively, in some embodiments, apparatus 800 may include an input and/or output device (I/O device).

In an embodiment, memory 814 may store software modules that provide functionality when executed by processor 812. The modules may include, for example, an operating system that provides operating system functionality for apparatus 800. The memory may also store one or more functional modules, such as an application or program, to provide additional functionality for apparatus 800. The components of apparatus 800 may be implemented in hardware, or as any suitable combination of hardware and software.

According to some embodiments, processor 812 and memory 814 may be included in or may form a part of processing circuitry or control circuitry. In addition, in some embodiments, transceiver 818 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 800) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 800 may be a network node or RAN node, such as a base station, access point, Node B, eNB, gNB, WLAN access point, or the like.

According to certain embodiments, apparatus 800 may be controlled by memory 814 and processor 812 to perform the functions associated with any of the embodiments described herein, such as some operations of flow or signaling diagrams illustrated in FIGS. 2 and 4. For example, apparatus 800 may be controlled by memory 014 and processor 812 to perform the methods of FIG. 2 and/or FIG. 4.

FIG. 8b illustrates an example of an apparatus 820 according to another embodiment. In an embodiment, apparatus 820 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 820 may be implemented in, for instance, a wireless handheld device, a wireless plug-in accessory, or the like.

In some example embodiments, apparatus 820 may include one or more processors, one or more computer-readable storage medium (for example, memory, storage, or the like), one or more radio access components (for example, a modem, a transceiver, or the like), and/or a user interface. In some embodiments, apparatus 820 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 820 may include components or features not shown in FIG. 8b.

As illustrated in the example of FIG. 8b, apparatus 820 may include or be coupled to a processor 822 for processing information and executing instructions or operations. Processor 822 may be any type of general or specific purpose processor. In fact, processor 822 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 822 is shown in FIG. 8b, multiple processors may be utilized according to other embodiments. For example, it should be understood that, in certain embodiments, apparatus 820 may include two or more processors that may form a multiprocessor system (e.g., in this case processor 822 may represent a multiprocessor) that may support multiprocessing. In certain embodiments, the multiprocessor system may be tightly coupled or loosely coupled (e.g., to form a computer cluster).

Processor 822 may perform functions associated with the operation of apparatus 820 including, as some examples, precoding of antenna gain/phase parameters, encoding and decoding of individual bits forming a communication message, formatting of information, and overall control of the apparatus 820, including processes related to management of communication resources.

Apparatus 820 may further include or be coupled to a memory 24 (internal or external), which may be coupled to processor 822, for storing information and instructions that may be executed by processor 822. Memory 824 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 824 can be comprised of any combination of random access memory (RAM), read only memory (ROM), static storage such as a magnetic or optical disk, hard disk drive (HDD), or any other type of non-transitory machine or computer readable media. The instructions stored in memory 824 may include program instructions or computer program code that, when executed by processor 822, enable the apparatus 820 to perform tasks as described herein.

In an embodiment, apparatus 820 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 822 and/or apparatus 820.

In some embodiments, apparatus 820 may also include or be coupled to one or more antennas 825 for receiving a downlink signal and for transmitting via an uplink from apparatus 820. Apparatus 820 may further include a transceiver 828 configured to transmit and receive information. The transceiver 828 may also include a radio interface (e.g., a modem) coupled to the antenna 825. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 828 may be configured to modulate information on to a carrier waveform for transmission by the antenna(s) 825 and demodulate information received via the antenna(s) 825 for further processing by other elements of apparatus 820. In other embodiments, transceiver 828 may be capable of transmitting and receiving signals or data directly. Additionally, or alternatively, in some embodiments, apparatus 820 may include an input and/or output device (I/O device). In certain embodiments, apparatus 820 may further include a user interface, such as a graphical user interface or touchscreen.

In an embodiment, memory 824 stores software modules that provide functionality when executed by processor 822. The modules may include, for example, an operating system that provides operating system functionality for apparatus 820. The memory may also store one or more functional modules, such as an application or program, to provide additional functionality for apparatus 820. The components of apparatus 820 may be implemented in hardware, or as any suitable combination of hardware and software. According to an example embodiment, apparatus 800 may optionally be configured to communicate with apparatus 800 via a wireless or wired communications link 870 according to any radio access technology, such as NR.

According to some embodiments, processor 822 and memory 824 may be included in or may form a part of processing circuitry or control circuitry. In addition, in some embodiments, transceiver 828 may be included in or may form a part of transceiving circuitry.

As discussed above, according to some embodiments, apparatus 800 may be a UE, mobile device, mobile station, ME, IoT device and/or NB-IoT device, for example. According to certain embodiments, apparatus 820 may be controlled by memory 824 and processor 822 to perform the functions associated with example embodiments described herein. For example, in some embodiments, apparatus 820 may be configured to perform one or more of the processes depicted in any of the flow charts or signaling diagrams described herein, such as those illustrated in FIGS. 2 and 4. For instance, apparatus 820 may be controlled by memory 824 and processor 822 to perform the method of FIG. 2 and/or FIG. 4.

Therefore, certain example embodiments provide several technological improvements, enhancements, and/or advantages over existing technological processes. For example, one benefit of some example embodiments is improved positioning by compensating for network node orientation offsets. As another example, one benefit of some example embodiments is improved coverage through downlink beam adjustment. Accordingly, the use of some example embodiments results in improved functioning of communications networks and their nodes and, therefore constitute an improvement at least to the technological field of UE positioning estimates, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 800 or apparatus 820), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

The invention claimed is:

1. An apparatus, comprising circuitry including at least one processor and at least one memory storing instructions that, when executed by the at least one processor, cause the apparatus to perform at least the following:
    providing first data indicative of a first relative angle-of-arrival measurement between a first set of base stations, including a first base station and a second base station, from a position of a user device, based on angle-of-arrival measurements made at the user device;
    providing second data indicative of a first angle-of-departure measurement indicative of an angle between the user device and the second base station of the first set of base stations from a position of the first base station, the second data also indicative of a second angle-of-departure measurement indicative of an angle between the user device and the first base station of the first set of base stations from the position of the second base station; and
    determining a beam directionality error associated with at least one of the first or second base stations, wherein the determining the beam directionality error is based on the first relative angle-of-arrival measurement and the first and second angle-of-departure measurements.

2. The apparatus of claim 1, wherein the at least one memory stores instructions that, when executed by the at least one processor, causes the apparatus to perform determining the beam directionality error based on a sum of the first relative angle-of-arrival measurement and the first and second angle-of-departure measurements equating to a value different than substantially 180 degrees.

3. The apparatus of claim 1, where the at least one memory stores instructions that, when executed by the at least one processor, causes the apparatus to perform determining which of the first and second base stations of the first set of base stations has the beam directionality error.

4. The apparatus of claim 3, wherein the at least one memory stores instructions that, when executed by the at least one processor, causes the apparatus to perform:
    identifying a second set of base stations comprising a selected one of the first set of base stations and a third base station;
    providing third data indicative of a second relative angle-of-arrival measurement between the second set of base stations from the position of the user device based on angle-of-arrival measurements made at the user device;
    providing fourth data indicative of third and fourth angle-of-departure measurements, each measurement indicative of an angle between the user device and an other base station of the second set of base stations from the position of the respective base station based on a plurality of beams transmitted from the respective base station to the user device; and
    determining that a non-selected one of the first set of base stations has the beam directionality error based on the second relative angle-of-arrival measurement and the third and fourth angle-of-departure measurements.

5. The apparatus of claim 4, wherein the at least one memory stores instructions that, when executed by the at least one processor, causes the apparatus to perform determining that the non-selected one of the first set of base stations has the beam directionality error based on a sum of the second relative angle-of-arrival measurement and the third and fourth angle-of-departure measurements equating to substantially 180 degrees.

6. The apparatus of claim 1, wherein the first data is computed at the user device based on an average of multiple relative angle-of-arrival measurements between the first and second base stations.

7. The apparatus of claim 6, wherein the first data is computed at the user device based on an average of multiple relative angle-of-arrival measurements from different respective sets of base stations.

8. The apparatus of claim 7, wherein the multiple relative angle-of-arrival measurements comprise the first relative angle-of-arrival measurement and a second relative angle-of-arrival measurement from a second set of base stations which comprises a selected one of the first set of base stations and a third base station.

9. The apparatus of claim 1, wherein the apparatus comprises the user device.

10. The apparatus of claim 9, wherein the at least one memory stores instructions that, when executed by the at least one processor, causes the apparatus to perform generating the second data based on received reference data from a location management system of a radio network, the reference data indicative of respective geographic locations of the first and second base stations and directional information for the plurality of beams transmitted by each of the first and second base stations.

11. The apparatus of claim 10, wherein the at least one memory stores instructions that, when executed by the at least one processor, causes the apparatus to perform: identifying a non-line-of-sight condition associated with one or more of the beams transmitted by the first and second base stations, and disregarding said one or more beams for determining the first and second angle-of-departure measurements.

12. The apparatus of claim 9, wherein the at least one memory stores instructions that, when executed by the at least one processor, causes the apparatus to perform computing, responsive to determining a beam directionality error for one of the first and second base stations, an updated position of the user device.

13. The apparatus of claim 1, wherein the apparatus comprises a location management function of a radio network, the location management function performing the providing the first data, the providing the second data, and the determining the beam directionality error.

14. The apparatus of claim 13, wherein the at least one memory stores instructions that, when executed by the at least one processor, causes the apparatus to perform receiving the first data from the user device and for receiving reference signal received power information from the user device for the plurality of beams of each of the first and second base stations for computing the second data indicative of the first and second angle-of-departure measurements.

15. The apparatus of claim 1, wherein the first angle-of-departure measurement is indicative of the angle between the user device and the second base station of the first set of base stations from the position of the first base station based on a plurality of beams transmitted from the first base station to the user device, and wherein the second angle-of-departure measurement is indicative of the angle between the user device and the first base station of the first set of base stations from the position of the second base station based on a plurality of beams transmitted from the second base station to the user device.

16. A method comprising:
providing first data indicative of a first relative angle-of-arrival measurement between a first set of base stations, including a first base station and a second base station, from a position of a user device, based on angle-of-arrival measurements made at the user device;
providing second data indicative of a first angle-of-departure measurement indicative of an angle between the user device and the second base station of the first set of base stations from a position of the first base station, the second data also indicative of a second angle-of-departure measurement indicative of an angle between the user device and the first base station of the first set of base stations from the position of the second base station; and
determining a beam directionality error associated with at least one of the first or second base stations, wherein the determining the beam directionality error is based on the first relative angle-of-arrival measurement and the first and second angle-of-departure measurements.

17. The method of claim 16, further comprising determining the beam directionality error based on a sum of the first relative angle-of-arrival measurement and the first and second angle-of-departure measurements equating to a value different than substantially 180 degrees.

18. The method of claim 16, further comprising determining which of the first and second base stations of the first set of base stations has the beam directionality error.

19. The method of claim 18, further comprising:
identifying a second set of base stations comprising a selected one of the first set of base stations and a third base station;
providing third data indicative of a second relative angle-of-arrival measurement between the second set of base stations from the position of the user device based on angle-of-arrival measurements made at the user device;
providing fourth data indicative of third and fourth angle-of-departure measurements, each measurement indicative of an angle between the user device and an other base station of the second set of base stations from the position of the respective base station based on a plurality of beams transmitted from the respective base station to the user device; and
determining that a non-selected one of the first set of base stations has the beam directionality error based on the second relative angle-of-arrival measurement and the third and fourth angle-of-departure measurements.

20. A non-transitory program storage device readable by a machine, tangibly embodying a program of instructions executable by the machine for performing operations, the operations comprising:
providing first data indicative of a first relative angle-of-arrival measurement between a first set of base stations, including a first base station and a second base station, from a position of a user device, based on angle-of-arrival measurements made at the user device;
providing second data indicative of a first angle-of-departure measurement indicative of an angle between the user device and the second base station of the first set of base stations from a position of the first base station, the second data also indicative of a second angle-of-departure measurement indicative of an angle between the user device and the first base station of the first set of base stations from the position of the second base station; and
determining a beam directionality error associated with at least one of the first or second base stations, wherein the determining the beam directionality error is based on the first relative angle-of-arrival measurement and the first and second angle-of-departure measurements.

* * * * *